US007009958B1

(12) United States Patent
Gerakoulis (10) Patent No.: US 7,009,958 B1
(45) Date of Patent: Mar. 7, 2006

(54) UNIFIED ENCODING PROCESS FOR GENERALIZED MULTIPLE ACCESS

(75) Inventor: Diakoumis Parissis Gerakoulis, Dover, NJ (US)

(73) Assignee: AT&T Corp., New York, NY (US)

( * ) Notice: Subject to any disclaimer, the term of this patent is extended or adjusted under 35 U.S.C. 154(b) by 996 days.

(21) Appl. No.: 09/861,240

(22) Filed: May 18, 2001

Related U.S. Application Data

(60) Provisional application No. 60/205,378, filed on May 19, 2000.

(51) Int. Cl.
*H04B 7/216* (2006.01)

(52) U.S. Cl. .................. 370/342; 370/335; 370/336; 370/344; 375/130

(58) Field of Classification Search ............. 370/208, 370/335–337, 342–345, 347, 320–321, 331, 370/394, 441–442, 479–480; 375/130, 140, 375/141, 146, 377
See application file for complete search history.

(56) References Cited

U.S. PATENT DOCUMENTS

| 5,319,634 | A | * | 6/1994 | Bartholomew et al. ..... 370/441 |
| 5,805,579 | A | | 9/1998 | Erving et al. |
| 5,805,583 | A | * | 9/1998 | Rakib .......................... 370/342 |
| 5,815,527 | A | | 9/1998 | Erving et al. |
| 5,838,669 | A | | 11/1998 | Gerakoulis |
| 5,995,497 | A | | 11/1999 | Gerakoulis |
| 6,011,789 | A | * | 1/2000 | Schilling ..................... 370/342 |
| 6,181,729 | B1 | * | 1/2001 | O'Farrell ..................... 375/130 |
| 6,219,347 | B1 | * | 4/2001 | Uchida et al. ............... 370/347 |
| 6,339,612 | B1 | * | 1/2002 | Stewart et al. .............. 375/140 |
| 6,414,985 | B1 | * | 7/2002 | Furukawa et al. ........... 375/142 |
| 6,510,147 | B1 | * | 1/2003 | Sun et al. .................... 370/335 |
| 6,590,889 | B1 | * | 7/2003 | Preuss et al. ................ 370/342 |
| 2003/0147655 | A1 | * | 8/2003 | Shatil ......................... 398/182 |

OTHER PUBLICATIONS

"Spread Spectrum Goes Commercial," by D. L. Schilling et al, IEEE Spectrum, Aug. 1990, pp. 40-45.
"Spread Spectrum for Commercial Communications," by D. L. Schilling et al, IEEE Communications Magazine, Apr. 1991, pp. 66-79.

(Continued)

*Primary Examiner*—Chi Pham
*Assistant Examiner*—Rhonda Murphy (57) ABSTRACT

In a multiple access embodiment user, information is encoded by a combination of symbol encoding and user encoding into a unified multiple access scheme that numerous interstitial encoding variations in the spatial and temporal intervals amongst FDMA, TDMA and CDMA encoding schemes. In this scheme, a transmitter includes a symbol encoding and a user encoder. The symbol encoding provides channel encoding and the user encoding provides system and user access into the communication link. The symbol encoding in turn provides the channel encoding and symbol keying while the user encoding provides the system access and user access into the communication link. The exact multiple access scheme provided by the signal encoding depends upon 1) the type of code sequence being used (i.e., orthogonal; pseudo-orthogonal; etc.); 2) the type of spreading used (i.e., spread spectrum; spread time; etc.) and 3) the pulse-shape of the data symbol (i.e., time-limited; bandwidth-limited; etc.). The various combinations of these parameters define an extensive space of new and novel multiple access systems of which FDMA, TDMA and CDMA are small isolated subsets. In this system, the user encoding process exists in a continuum. User encoding may use both real and imaginary spreading sequences. By choice of these three, a desirable multiple access method is achieved without restriction to the limited number of traditional conventional multiple access methods.

4 Claims, 6 Drawing Sheets

OTHER PUBLICATIONS

"Optical Phase Division Multiplexing for Local Communications Applications," by L. J. Cimini, Jr., IEEE Transactions on Communications, vol. 37, No. 12, Dec. 1989, pp. 1282-1292.

"Spread-Time Code Division Mlultiple Access," by P. Crespo et al, Globecom 1991, pp. 0836-0840.

"Spread-Time Code-Division Multiple Access," by P. M. Crespo, IEEE Transactions on Communications, vol. 43, No. 6, Jun. 1995, pp. 2139-2148.

* cited by examiner

UNIFIED ENCODING PROCESS FOR GENERALIZED MULTIPLE ACCESS

This application claims priority of provisional application 60/205,378 filed May 19, 2000.

FIELD OF THE INVENTION

This invention concerns the field of multiple access where a plurality of participants (i.e., multiple points) in a communication system access some common processor (i.e., a single point) through multi-use channels. It concerns multi-user communication systems and in particular a unified method of user encoding. In a particular aspect, the invention defines a composite access method in which encoding sequences are combined.

BACKGROUND OF THE INVENTION

Multiple access is a fundamental part of many communication systems having originating multipoint terminuses that operate autonomously. Such systems may be alternatively designated as multi-point-to-point systems. Point-to-multipoint systems, known as multiplex systems are the reverse of this. Multiplex systems may operate asynchronously while multiple access systems work best when synchronized.

In a multiple access communication system, multiple users typically share a common communication medium (or channel). A common example, of multiple access, is a wireless cellular communication system in which a single-base station communicates with a plurality of mobile subscriber units. To successfully achieve multiple access requires a plurality of substantially non-interfering channels to transmit the multifarious user information to be transmitted. Several well-established techniques exist in the art to achieve these non-interfering channels. The best known are frequency division multiple access (FDMA), time division multiple access (TDMA) and spread spectrum including direct sequence code division multiple access (DS-CDMA) and frequency hopping code division multiple access (FH-CDMA). These multiple access techniques have mostly been applied to wireless communication systems although their use is not limited to wireless systems.

FDMA is a technique of dividing an allocated frequency spectrum into a plurality of frequency bands with each individual frequency band supporting an information channel for a particular user. In many instances, N frequency bands serve as N information channels for N users.

TDMA divides a frequency band into a plurality of time slots wherein each user of that frequency band is assigned a particular time slot as that user's information channel. Information for a particular user is only transmitted during that user's designated time slot. A communication may operate with a plurality of frequency bands with each individual frequency band divided into a plurality of assignable time slots. This is sometimes known as a combination of TDMA and FDMA. TDMA normally requires a digital signal transmission since the information signals must be processed to fit into a particular time slot.

CDMA (Code Division Multiple Access) takes varied forms; the most common forms being DS-CDMA and FH-CDMA. DS-CDMA systems in pure form use a single common transmission frequency band that is shared in common by all users of that frequency band. Individual channels are achieved by having each user modulate/spread his particular information with a unique spreading code before transmission. The spreading code is re-applied at a receiver to recover or extract the particular information of that user. A TDMA and FDMA system may use the practices of CDMA within their defined channels.

FH-CDMA as a technique defines a particular user channel as a sequence of hopping frequency bands (i.e. a sequence of different frequency bands having a unique sequence of frequency band hops for each user). This is a technique in which no two successive bands, of the particular user channel, are identical and in which the frequency band hops are selected so that no two channels share a common frequency band at the same time.

In the realm of digital communications these techniques may further be categorized as having orthogonal or pseudo-orthogonal channels. In orthogonal access methods, the communication channel is divided into user channels that are non-interfering to one another. Pseudo-orthogonal channels allow some limited interference between user channels since the user channels are not perfectly orthogonal to one another. FDMA and TDMA are traditionally orthogonal while CDMA may be both. Orthogonality of communication system channels is an important consideration in designing a communication system.

Each of the techniques described above has its particular advantages and disadvantages, which are expressed in the nature of the information signals (i.e., analog, digital, etc.), the hardware apparatus (i.e., FM, AM, etc.), the robustness of varied signals (i.e., interference sensitivity, etc) and numerous other varied concerns. They are largely incompatible with one another. Selection of any one of these techniques implies a compromise between the advantages and disadvantages of each. It would be very advantageous to reduce the number of compromises required for any particular communication system requiring multiple access. It is critical that channel integrity be preserved in all available formats.

The piecemeal development of the foregoing prior art multiple access methods has led to incompatible multiple access methods. This has contributed to standards development that are inconsistent to one another. It further limits flexibility in achieving multiple access with particular goals to achieve.

SUMMARY OF THE INVENTION

In an exemplary embodiment of the invention, user information is encoded by a combination of symbol encoding and user encoding into a unified multiple access scheme that provides numerous interstitial encoding variations. Spreading codes varying in time and spectrum define a composite encoding system, which include as special instances FDMA, TDMA and CDMA systems achieved by new and novel methods of encoding schemes. In an exemplary scheme a transmitter includes a user encoder providing system and user access into the communication link.

The exact multiple access scheme provided by the encoding method depends upon 1) the type of code sequence being used (i.e., orthogonal; pseudo-orthogonal; etc.); 2) the type of spreading used (i.e., spread spectrum; spread time; etc.) and 3) the pulse-shape of the data symbol (i.e., time-limited; bandwidth-limited; etc.). The various combinations of these parameters define an extensive space of new and novel multiple access systems of which FDMA, TDMA and CDMA are small isolated subsets. In this system the user encoding process exists in a continuum. User encoding may use both real and imaginary spreading sequences. By choice of these three, a desirable multiple access method is achieved without restriction to the limited number of traditional conventional multiple access methods.

In one aspect, the invention uses a generalized spreading technique to achieve a wide range of multiple access characteristics. The generalized multiple access technique is herein designated as generalized CDMA (G-CDMA), which includes as subsets generalized TDMA and FDMA (i.e., G-TDMA and G-FDMA). In all instances a spreading technique is used which permits multiple users to access a communication medium with various instances of a generalized CDMA space. A composite multiple access method in which a number of basic coding sequences are combined, as Kronecker products, generate access methods distinct from basic multiple access methods In another aspect, or the invention, the basic methods described above are combined to provide composite multiple access in which signal spreading is combined within overspreading operation. In overspreading a spreaded symbol is used as the input to a subsequent spreading operation. This system advantageously provides system access to individual users as well as to groups of users. In one illustrative embodiment spread spectrum and time multiple access may be combined.

DETAILED DESCRIPTION

User encoding according to the invention is a process in which code sequences are used to spread and identify users in a communication domain through spreading operations. The spreading in particular creates a space in communication channels for a plurality of users. Encoded signals depend upon types of code sequences used; on the type of spreading used and on pulse-shapes of data symbols. A similar alternative process may be used that only encodes in terms of user encoding and decoding. The various combinations of these parameters are used to create a large set of multiple access arrangements, which include traditional type, multiple access results by novel methods as subsets of the large sets.

Figure 1:
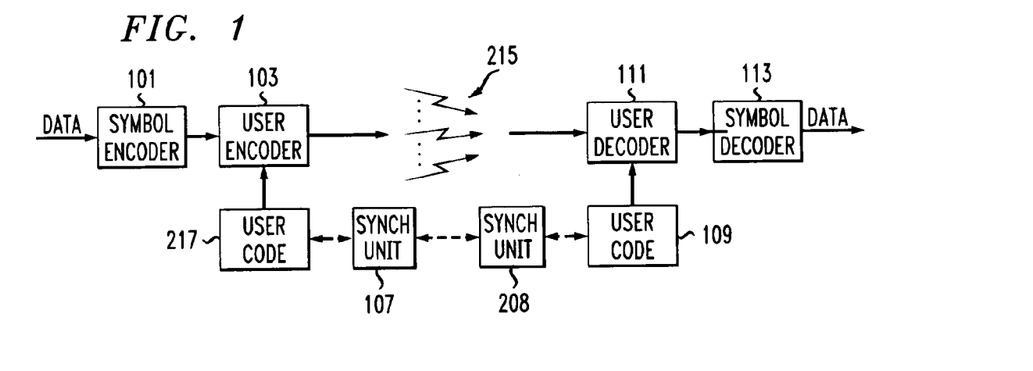
FIG. 1 is a block schematic of a canonical multi-user data communications process.

A canonical multi-user data communication system, such as shown in the FIG. 1, provides the necessary encoding processes. Data for transmission, in a multiple access system is input into a symbol encoder 101, which provides channel encoding, and symbol keying. User encoder 103 provides the user access to the communication link 215. Synchronizing unit 217 communicates with synchronizing unit 208 to synchronize the receiving user decoder 111 with the transmitting user encoder 103. Symbol decoder 113 recovers the original data processed by the symbol encoder 101. In these systems, synchronization between transmitter and receiver is required in systems using PN (pseudo-random) codes. In systems using fully orthogonal codes, synchronization is required among all users.

Figure 2:
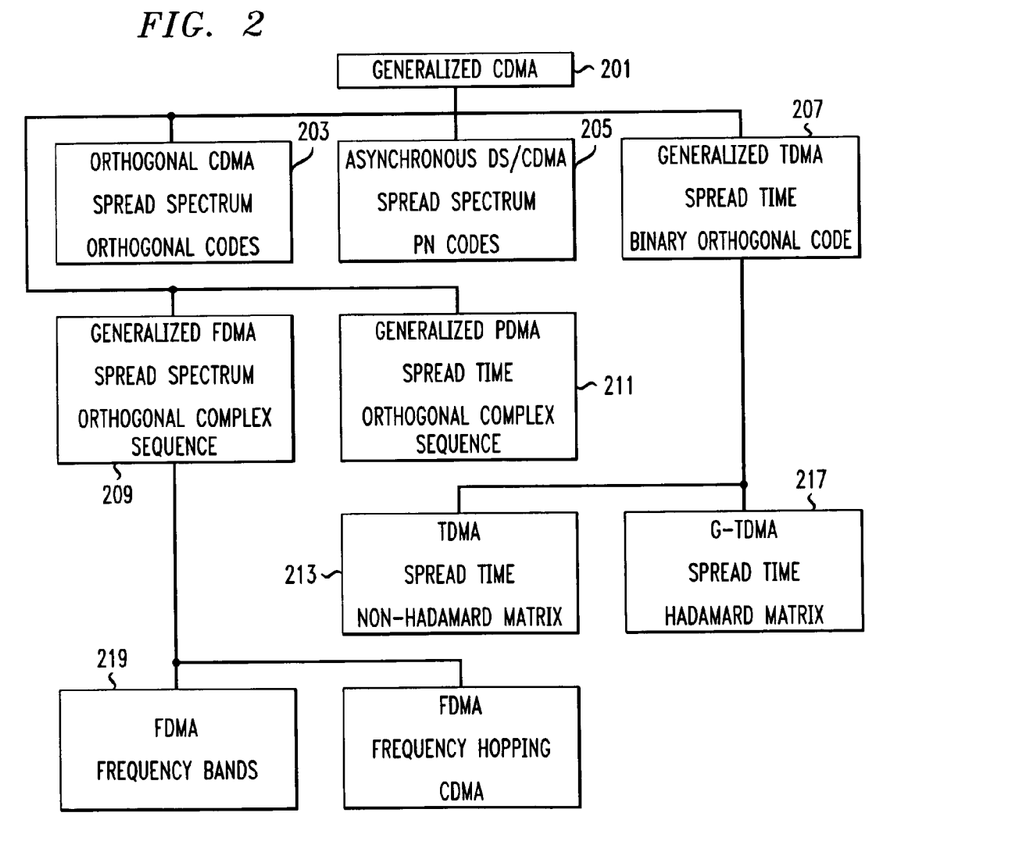
FIG. 2 is a tree-graph of a space illustration of related multiple access methods.

Relationships (i.e., hierarchal) between various multiple access methods included under the generalized CDMA are illustrated in the FIG. 2. An initial selection in creating a particular encoding scheme, according to the exemplary example, concerns selecting between various spread spectrum encoding techniques to achieve specific user encoded signals by application of specific spreading codes and techniques all subsidiary to the generalized CDMA technique indicated by the box 201. From this introductory generalized mode, specific encoding characteristics may be obtained and in many instances, these specific encoding characteristics are those, which have been obtained in the technology by other specialized techniques. That these techniques are all interrelated is not readily apparent using traditional techniques.

In general, various multiple access methods may be achieved by varying types of code sequences, types of spreading and pulse shapes selected. In the illustrative example, the interrelatedness does become apparent. Once in a generalized CDMA mode a traditional orthogonal CDMA mode (i.e., the generalized CDMA) may be produced by use of binary orthogonal coding sequences and time-spreading techniques. This defines an encoding sequence $c_i$ applied, by operator "X", to a data vector $d_i$ to obtain the encoded signal $s_i$ and may be symbolically expressed as:

$$s_i = c_i \times d_i$$

Where the encoded signal of user i, $s_i$, is a product of vectors $d_i$ and $c_i$.

Figure 3:
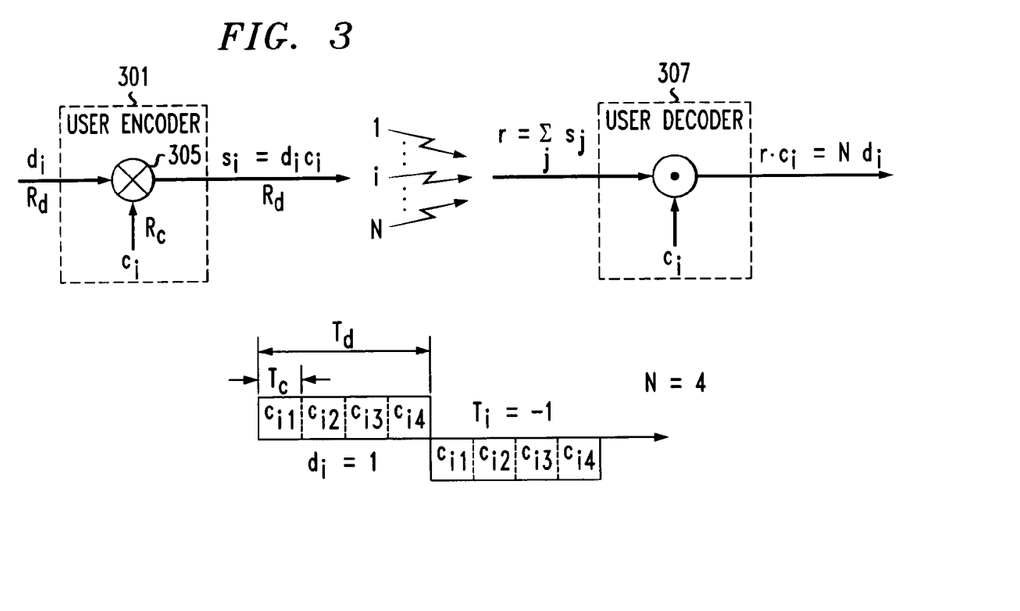
FIG. 3 is a block schematic of spread spectrum circuitry for use in a generalized CDMA system.

An exemplary example of the generalized CDMA is shown in the FIG. 3 where the schematic shows the encoding and decoding stations 301 and 307 in a typical multiple access scheme. An encoder station 301, as shown in FIG. 3, accepts the data signal input $d_i$ and a spreading code input $c_i$ (at code rate $R_c$); both are applied to encoder device 305. An encoded output $s_i$ is obtained from this process at a data rate $R_d$. The encoding signal illustrated has a particular spread time illustratively shown in the accompanying graph at the bottom of FIG. 3. While spread time is illustratively shown in the accompanying graph of FIG. 3, the generalized CDMA method may use spread spectrum codes.

Figure 4:
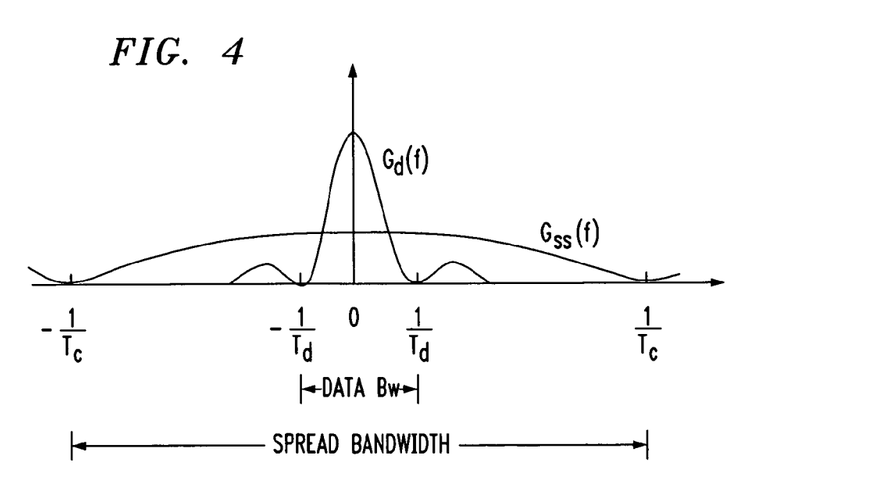
FIG. 4 is a graph of spectrum spreading occurring in CDMA applications.

Orthogonal multiple access codes require accurate global system synchronization. This requirement may be relaxed by using the asynchronous DS/CDMA as shown in the block 205 where Pseudo Random Number (PN) spreading codes are used in a system such as shown in the multiple access system of FIG. 3. Here the spreading code results in a spread time system resulting in a spread frequency as shown in the graph of FIG. 4 showing the spread bandwidth function $G_{ss}$ (f) as compared with the data bandwidth function $G_d$ (f).

Figure 5:
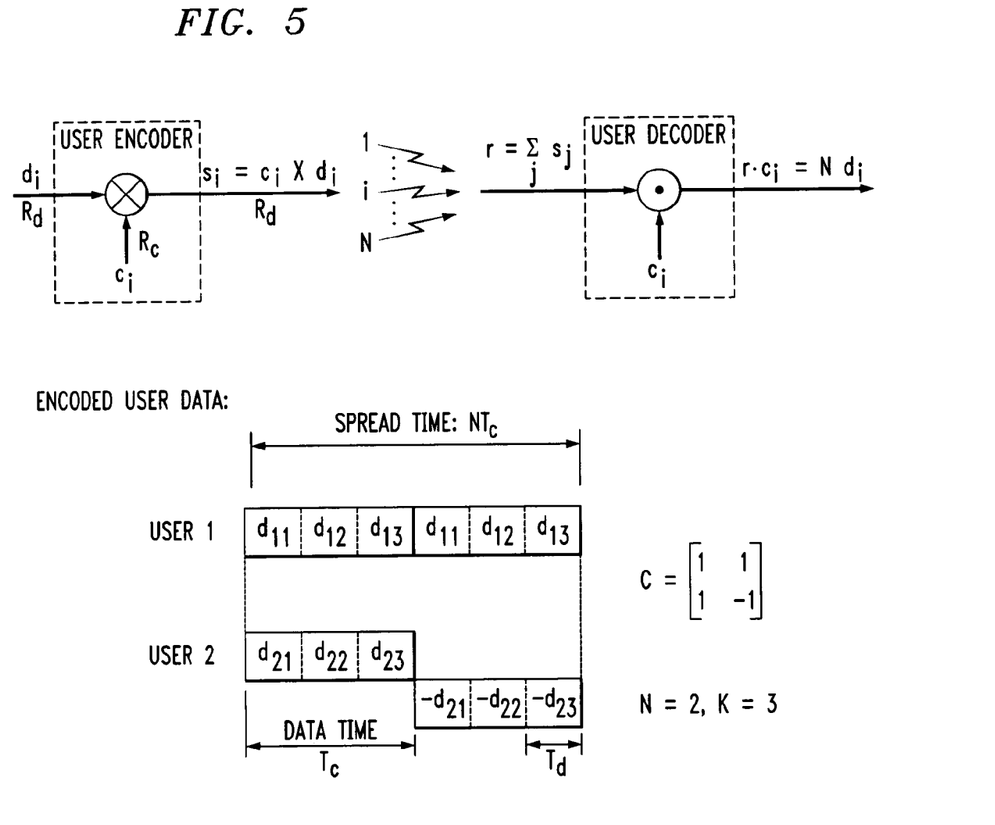
FIG. 5 is a block schematic and associated graph defining generalized time division multiple access.

A generalized TDMA system is obtainable in a multiple access system as shown in the FIG. 5 by selection of a spread time code. This code is has a longer interval than the symbols of the data vector being encoded as shown by the exemplary spreading code at the bottom of FIG. 5. The matrix illustratively shown in FIG. 5 shows an exemplary code for this process. The system/process of FIG. 5 may use both codes derived from Hadamard matrices and codes derived from non-Hadamard matrices.

Figure 6:
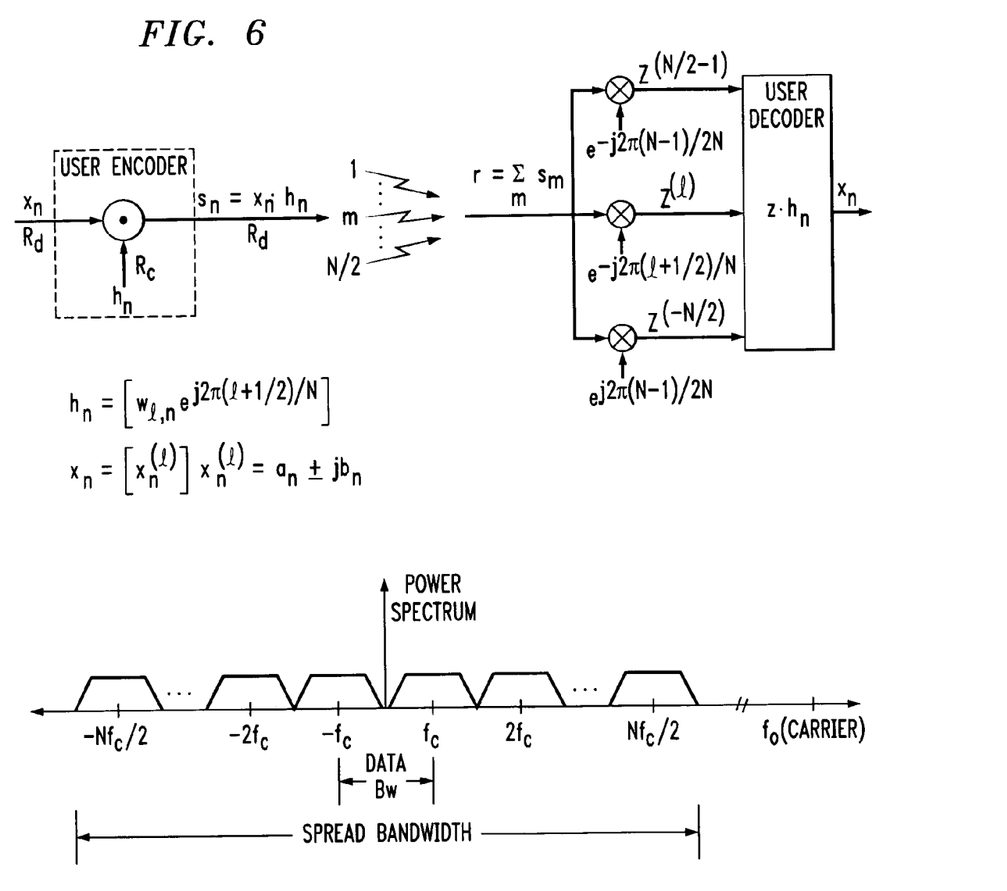
FIG. 6 is a block schematic and graph defining Generalized frequency division multiple access.

One output of the coding process that comports with the coding approach of block 213 by using a non-Hadamard matrix as a code basis is shown in the graph of FIG. 6. This output resembles a conventional TDMA multiple access system in that each individual user '1' through N has their own individual time slot in which transmissions are made. Use of Hadamard matrices, for a spread time code provides the generalized TDMA as shown by block 217.

Frequency division is another technique obtainable from choice of spread spectrum and orthogonal code sequence selection as indicate in block 209 of FIG. 2. A generalized FDMA is obtained by use of spectrum spreading with complex orthogonal coding sequences using Hadamard matrices as the base. A multiple access system using generalized FDMA is shown in the FIG. 6 wherein the user encodes input data signal $x_n$ with the coding signal $h_n$. The encoded signal $S_n$ is transmitted to a user decoder where as signal $x_n$ is recovered form a transmitted signal $S_n$ by being despread by the complex despreading codes $e^{-j2\pi}$.

Figure 7:
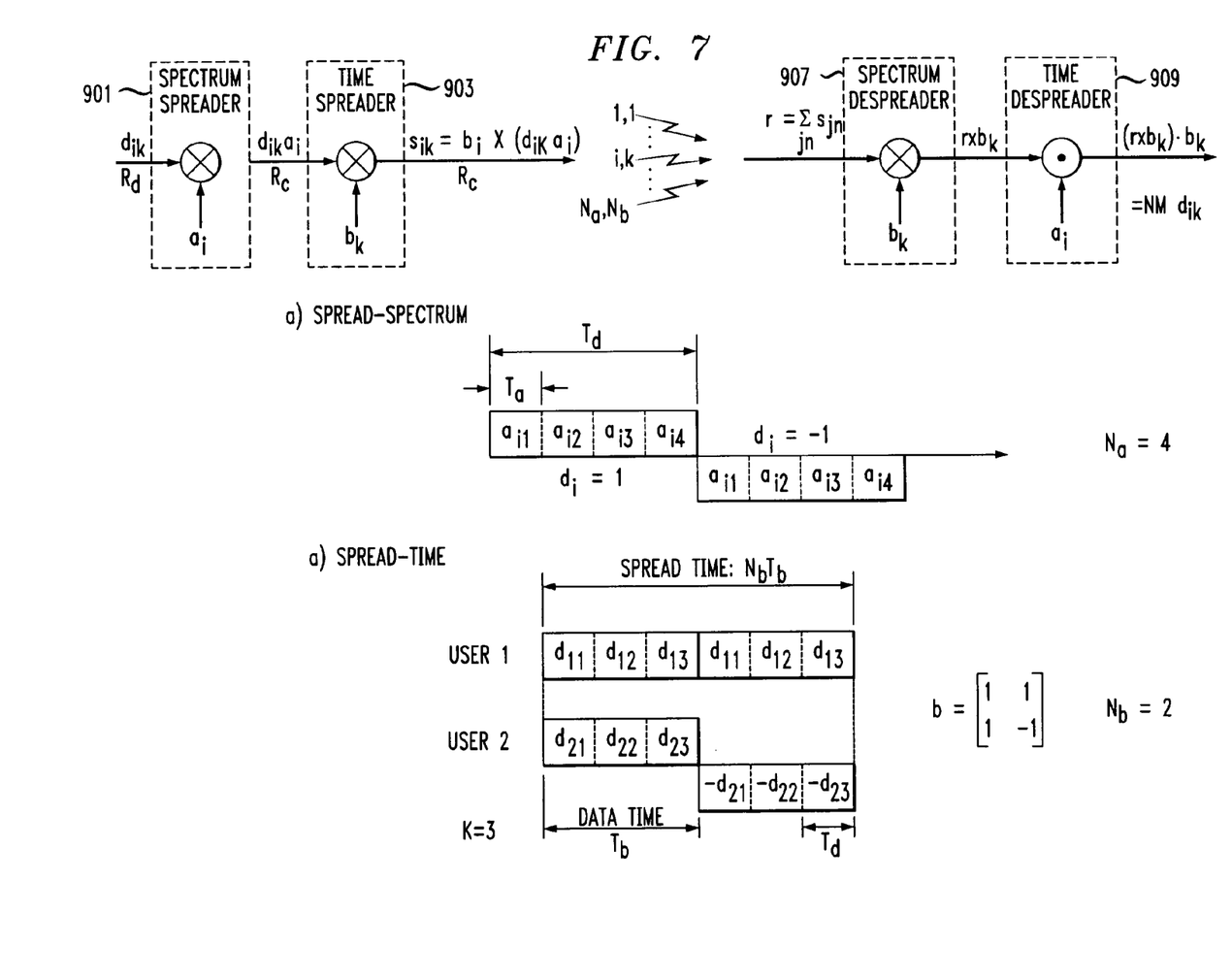
FIG. 7 is a graph defining FDMA in a combined spread spectrum and spread time multiple access.

The FDMA of block 219 is obtained by application of complex non-Hadamard coding sequences and spread spectrum encoding. The FDMA output is shown at the top of FIG. 7, and an illustrative Hadamard matrix in which each row and column has exactly one non-zero entry is shown at the bottom of FIG. 7. This particular version of FDMA is synchronized and does not require guard-bands between the frequency bins. If each frequency bin changes the sequenced complex spreading term modulo (N/2) a frequency hopping CDMA is obtained in which each successive bin operates at a different frequency.

Various technical aspects of this are discussed in the attached appendix which describes in detail the multiple access characteristics and parameters of each.

Figure 8:
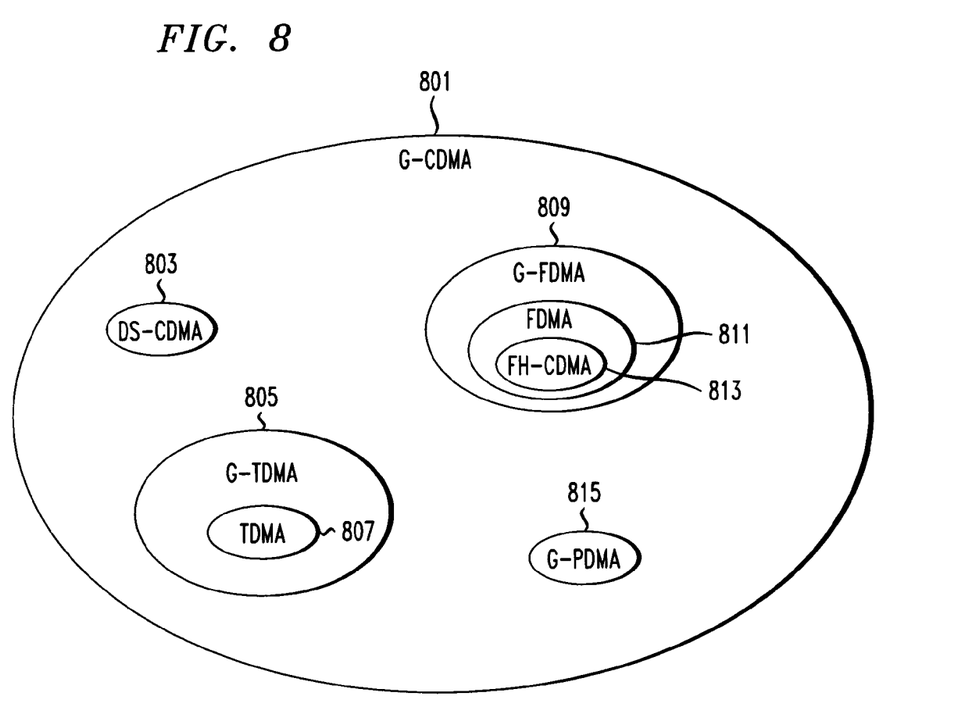
FIG. 8 is a space layout of the various multiple access techniques achievable by generalized CDMA techniques.

A space diagram interpretation of multiple access methods according to the present invention is graphically illustrated in the FIG. 8. This provides a non-hierarchal view of the operating range of the generalized CDMA. The external elliptical boundary 801 encompasses all generalized CDMA multiple access methods, which may be generated by the processes of the invention. These processes, as indicated above, generally entail the use of code sequences used for spreading an operating domain (i.e. time or spectrum) to identify users in each operating domain. This overall process is herein identified as generalized CDMA (G-CDMA). Included within the defined multiple access space is a subspace (i.e., subset) 803 process in which a spreading process is used to generate DS-CDMA user encoding. Another subspace 805 defines a subset of G-TDMA processes including its own subspace 807 defining TDMA processes. A subspace 809 concerns Generalized FDMA (G-FDMA). Within subspace 809 are the nested subspaces 811 for FDMA and 813 for FH-CDMA. A subspace 815 represents the Generalized Phase Division multiple Access (G-PDMA).

The operation locus of any of the multiple access processes, within the generalized CDMA multiple access space, is determined by 1) the type of code sequence used (i.e., orthogonal or pseudo-orthogonal; each of which may be real or complex). 2), the type of spreading (i.e., spread spectrum in the frequency domain or spread time in the time domain) and 3) the pulse shape of the data symbol (i.e. the pulse shape may be time-limited or band-limited). Particular combinations of these parameters each define a specific multiple access method. Some of these methods will be special cases paralleling the identified subsets although the process allows methods anywhere within boundary 801. Some of the special encoding cases are broadened versions of traditional multiple accessing methods and some are similar to known multiple access processes but attained herein by new encoding methods. Hence, with the techniques presented herein new multiple access methods have been created and conventional methods have been enabled by novel encoding methods.

The generalized encoding process permits techniques of a generalized CDMA to achieve multiple access methods normally obtained by other methods. These results have been outlined above. These varied multiple access coding methods exist in a continuum of the generalized CDMA process and may be achieved by the following exemplary methods. These methods generally entail selection of appropriate user codes, spreading factors and pulse shapes to achieve the desired multiple access process. In all the individual processes, the user encoding is a process in which a particular code sequence is used to spread an operating domain (i.e., a user supplied information signal) in time or spectrum and to further identify each user signal. The spreading operation creates a space in which all accessing users are contained.

The method of encoding a signal is dependent upon:

1) The type of code sequence used. Code sequences may be orthogonal or pseudo-orthogonal based on real or complex numbering;

2) The type of spreading may be in the frequency domain (i.e., spread spectrum) or in the time domain (i.e., spread time);

3) The pulse shape of data symbols may be time limited or bandwidth limited.

Encoding with a real coding sequence involves use of a code sequence that is real numbers. Examples of real coding techniques are illustrated in the attached appendix pages A1 through A8. In the example, the initial illustration assumes an encoding with a square pulse waveform and a binary±1 sequence. The encoded signal is defined by the encoding process defined by $s_i(t)=d_i(t)*c_i(t)$. The next step is to select either spread spectrum or spread time.

In selecting spread spectrum the length of the data symbol is greater than the length of the encoding symbol. Hence, the coding rate $R_c$ is greater than the data rate $R_d$ and the required bandwidth must be spread to accommodate the coding rate (i.e., Rc=NRd). The encoder may now select between an orthogonal sequence code (i.e., orthogonal or synchronous CDMA) or a pseudo-random noise (PN) code (i.e., direct sequence of synchronous CDMA).

With orthogonal CDMA the transmitted signal $s_i(t)$ has the rate $Rc=NR_d$ with the bandwidth of the transmitted signal N times wider than the bandwidth of the data signal $d_i(t)$ (spread spectrum) and the spreading factor $N_s>1$. Since the chip pulse is time limited, a band-limiting filter (LPF) is used to limit overall bandwidth. All users of the system are synchronized to a reference time so that chips and symbols are aligned at a receiver.

Using pseudo-random noise for spreading requires PN sequences with length L represented by a continuous time function $c_i(t)$ (defined in the appendix page A). Since the signal is asynchronous the signal is recovered at a receiver by correlating the received signal r (t) with a locally generated signal ci (t) cos $2\pi f_0 t$ of user i over the period of the symbol k=0. The bandwidth required of the transmitted signal is the same is di (t) while the required time for the transmission of its data symbols is N times longer (i.e., spread time). The ST spreading factor is $R_d/R_c=N>1$. As described in the appendix the use of certain characteristics where si=ci×di has a spread time access called Generalized TDMA. Spreading codes for this generalized TDMA be in Hadamard and non-Hadamard matrix form. Under specific conditions including using code sequences based on a non-Hadamard matrix TDMA may be achieved where a user I transmits only in time slot i.

Encoding with a complex coding sequence utilizes orthogonal or pseudo-orthogonal complex sequences. These matrices may comprise complex Hadamard matrices; polyphase orthogonal matrices or Fourier orthogonal transform matrices.

As is the case with real encoding sequences, complex encoding sequences may include orthogonal and pseudo orthogonal SS-CDMA spreading. As discussed below Generalized FDMA, where conventional FDMA and frequency hopping CDMA are special cases, are achieved. The synchronous orthogonal complex encoding is analogous to that of real synchronous orthogonal encoding and the pulse shape is time-limited (i.e., square pulse) and the filter is bandwidth limiting. The spreading code rate is higher than the data rate. Due to the spectral form of the data pulse, the encoding system may be considered as a generalized frequency division multiple access system. A Hadamard matrix is used for encoding and the energy of transmitted signals is distributed over all frequency bins (i.e., all users transmit simultaneously in every frequency bin). In a special case using non-Hadamard matrices, the system reduces to FDMA in which each user transmits only in an assigned frequency bin. Adding a factor to the transmitted signal symbol, as demonstrated in the appendix, results in frequency hopping CDMA signals.

The encoded symbol is defined by the relation:

$$s_n = x_n c_n e^{j\pi i/N}.$$

The access method of spread time (i.e., when encoding sequences are real) is translated into spread phase with the use of complex spreading sequences. From this complex orthogonal coding spread phase CDMA may be achieved. A data symbol of user n is repeated N−1 times and each one is placed on one of N−1 different phases. The data rate is the same as the rate of phase change and hence no spread spectrum occurs. The same symbol appears with different phases producing a spread phase multiple access system.

The methods of the above multiple access schemes may be used to define a composite multiple access scheme in which a composite access based on spreading and overspreading are combined providing a unique form of multiple access. A first encoding method encodes a symbol producing a spreaded signal which is then takes as an input to another spreading process or encoder. These two sequential processes (i.e., two orthogonal processes) generate an extended orthogonal code, which defines a composite multiple access.

Examples of composite multiple access may involve a first spreading followed by 1) spectrum overspreading or 2) followed by time overspreading. In a specific illustrative arrangement, a spread spectrum spreading is followed by time spreading using real or complex sequences in each step of spreading.

Composite multiple access is defined by two or more orthogonal accesses using the "extended" codes, which is in combination also an orthogonal access. Other examples include spectrum overspreading; time overspreading; and spectrum and time spreading using real and complex sequences. Spectrum overspreading for example is formed by spreading and overspreading in spectrum for a purpose of providing access to individual users as well as groups of users. The double access scheme separates and provides access to users both as individuals and as groups.

The nature of the spreading and overspreading may readily be discerned by referring to the FIG. 7, which illustrates an exemplary spread spectrum and time multiple access composite system. The signal being processed for multiple access is first spread by a code sequence $a_i$ for achieving spectrum spreading in spectrum spreader. The spectrum spreaded signal is subsequently additionally time spread in time spreader by a code sequence $b_i$ for achieving time spreading. The despreading is achieved at a receiver including a spectrum despreader and a time despreader. In the illustrative processes the input data signal $d_{ik}$ is spread in spectrum spreader by spreading code $a_i$ into $d_{ik}a_i$. $d_{ik}a_i$ is time spread in spreader into the composite spread signal $s_{ik}$ where $s_{ik} = b_i \times (d_{ik}a_i)$. The reverse process is performed at the receiver comprising spectrum despreader and time despreader. sjn is spectrum despread, $b_k$, into $r \times b_k$. $r \times b_k$ is time despreaded into $(r \times b_k)b_k = NM\ d_{ik}$. (Where N is the number of users and M is the number of groups or cells). If both coding matrices are orthogonal, the composite matrix and resulting multiple access signals are orthogonal. Particulars of this process may be obtained from the following attached appendix.

We have seen from the forgoing description how through the use of various spreading techniques and codes spreading may be used to achieve a variety of multiple access methods, some of which are new, and others which mimic traditional multiple access techniques. Many particulars of these techniques have been discussed; others are implied. Many techniques will be apparent to those skilled in the art without departing from the spirit and scope of the invention.

I claim:

1. A method of encoding user information in a multiple access communication system, comprising the steps of:
    determining desirable multiple access characteristics for an application;
    selecting an encoding method to achieve the desirable characteristics to achieve a desirable advantage; including:
        selecting a type of code sequence;
        selecting a type of spreading;
        selecting a data pulse shape; and
    combining the selected code sequence type, the selected spreading type, and the selected data pulse shape to define a multiple access system having the desired characteristics wherein a multiple access method encodes by one of CDMA, TDMA, FDMA and PDMA methods wherein the step of selecting a type of code sequence selects a complex numbered code and the step of selecting a type of spreading selects a time spreading to produce a PDMA multiple access process.

2. A method of providing multiple access communications, comprising the steps of:
    encoding data by spreading techniques;
    selecting the spreading variables, including one from a set containing:
        real and complex numbered codes;
        orthogonal codes;
        pseudo-orthogonal codes;
        spread spectrum and spread time codes; and
        time limited and bandwidth limited data symbols;
    to achieve a specific multiple access process, including one of the following processes within a generalized code division multiple access process;
        a generalized time division multiple access;
        a time division multiple access;
        a phase division multiple access;
        a generalized frequency division multiple access;
        a frequency division multiple access, where achieving the frequency division multiple access process is accomplished by application of a non-Hadamard orthogonal matrix as a spreading code source wherein each matrix row and column includes one and only one zero entry.

3. A method of providing multiple access communications, comprising the steps of:

encoding data by spreading techniques;

selecting spreading variables, including one of: real and complex numbered codes; orthogonal and pseudo-orthogonal codes and spread spectrum and spread time codes; and time limited and bandwidth limited data symbols; to achieve a specific multiple access process, including one of the following processes within a generalized code division multiple access process;

a generalized time division multiple access;

a time division multiple access;

a phase division multiple access;

a generalized frequency division multiple access;

a frequency division multiple access, where achieving the phase division multiple access process by:

applying a spread time code with complex sequences to spread a signal;

deriving the spread time code from an orthogonal Hadamard matrix; and employing a data rate that is equal to that of the phase change.

4. A method of processing signals in a multiple access communications system within a continuum of a generalized CDMA process, comprising steps of:

encoding communication signals with a combination of processing parameters to create a desired multiple access process; including selecting a code sequence to spread a signal from selected parameters including orthogonal codes, pseudo-orthogonal codes, real number sequences and complex number sequences;

selecting a spreading code from among spread spectrum in a frequency domain and spread time in a time domain; and selecting a pulse shape for a data symbol from among time limited and bandwidth limited pulses, where deriving a spread phase PDMA multiple access by selecting a orthogonal complex number sequence for spreading.

* * * * *